United States Patent
Ishihara (10) Patent No.: US 8,077,216 B2
(45) Date of Patent: Dec. 13, 2011

(54) IMAGE PICKUP APPARATUS WITH A HUMAN FACE DETECTING FUNCTION, METHOD AND PROGRAM PRODUCT FOR DETECTING A HUMAN FACE

(75) Inventor: Masanori Ishihara, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 876 days.

(21) Appl. No.: 12/152,889

(22) Filed: May 16, 2008

(65) Prior Publication Data

US 2008/0284867 A1    Nov. 20, 2008

(30) Foreign Application Priority Data

May 18, 2007    (JP) .................................. 2007-132282

(51) Int. Cl.
*H04N 5/228*    (2006.01)
*G06K 9/00*    (2006.01)
(52) U.S. Cl. ..................................... 348/222.1; 382/118
(58) Field of Classification Search ............... 348/222.1; 382/118
See application file for complete search history.

(56) References Cited

U.S. PATENT DOCUMENTS

| | | | |
|---|---|---|---|
| 2004/0228505 A1* | 11/2004 | Sugimoto | 382/118 |
| 2006/0192784 A1* | 8/2006 | Yamaji et al. | 345/473 |
| 2007/0242861 A1* | 10/2007 | Misawa et al. | 382/118 |

FOREIGN PATENT DOCUMENTS

| | | |
|---|---|---|
| JP | 2004-334836 A | 11/2004 |
| JP | 2005-286940 A | 10/2005 |
| JP | 2006-018706 A | 1/2006 |
| JP | 2006-133941 A | 5/2006 |
| JP | 2007-108990 A | 4/2007 |

OTHER PUBLICATIONS

Japanese Office Action dated Feb. 24, 2009 (2 pages), and English translation thereof (3 pages) issued in counterpart Japanese Application No. 2007-132282.

* cited by examiner

*Primary Examiner* — Jason Chan
*Assistant Examiner* — Joel Fosselman
(74) *Attorney, Agent, or Firm* — Holtz, Holtz, Goodman & Chick, PC (57) ABSTRACT

A digital camera has a human face dictionary set 151 for storing information defining peculiarities of a human face and a mode selection key 142 for selecting a first mode or a second mode, wherein the first mode is for putting priority to a speed at which the human face is detected and the second mode is for putting priority to accuracy of detecting the human face. When the first mode has been selected with the mode selection key 142, a control unit 7 controls a face detecting unit 15 to read less information from the human face dictionary set 151 than information to be read from the human face dictionary set 151 when the second mode has been selected, and to use the less information to detect a face of a person to be photographed with CCD 2. When the face of the person is detected, the control unit 7 processes a photographed image of the person based on image information of the detected face and records the processed image in an external memory 13.

8 Claims, 5 Drawing Sheets

|  | SPEED PRIORITY MODE | ACCURACY PRIORITY MODE |
|---|---|---|
| FACIAL PECULIARITY DICTIONARY A | FLAG ON | FLAG ON |
| FACIAL PECULIARITY DICTIONARY B | FLAG ON | FLAG ON |
| FACIAL PECULIARITY DICTIONARY C | FLAG OFF | FLAG ON |
| ⋮ | ⋮ | ⋮ |
| FACIAL PECULIARITY DICTIONARY N | FLAG OFF | FLAG ON |

# IMAGE PICKUP APPARATUS WITH A HUMAN FACE DETECTING FUNCTION, METHOD AND PROGRAM PRODUCT FOR DETECTING A HUMAN FACE

BACKGROUND OF THE INVENTION

1. Field of the Invention

The present invention relates to an image pickup apparatus with a human face detecting function, a method of detecting a human face, and a program product for detecting a human face.

2. Description of the Related Art

A conventional technique is used that detects a face of a person to be photographed and executes a photographing process mainly on a face portion in an image of the person to be photographed. Further, a technique is also used that specifies a face portion in an image of a person to be photographed as a search area, and successively rotates an image within the search area or the face portion by every predetermined angle and calculates an evaluation value for each rotation angle, whereby it is judged using the calculated evaluation values whether the image within the search area is a face of a person to be photographed.

SUMMARY OF THE INVENTION

The present invention has an object to provide an image pickup apparatus, a method of detecting a human face and a computer readable recording medium, which stores a computer program of detecting a face of a person to be photographed in accuracy that a user desired for photographing the person with his or her face in focus.

According to one aspect of the present invention, there is provided an image pickup apparatus which comprises an image pickup unit for obtaining an image of a person, an information storing unit for storing information defining peculiarities of a human face of a person, a selection judging unit for judging which of a first mode and a second mode has been selected, wherein the first mode is a mode in which priority is put to a speed at which the human face is detected and the second mode is a mode in which priority is put to accuracy of detecting the human face, a control unit for, when the selection judging unit determines that the first mode has been selected, controlling to read less information from the information storing unit than information which is to be read from the information storing unit when the selection judging unit determines that the second mode has been selected, and to detect the human face in the image of the person obtained by the image pickup unit, using the read less information, and a recording unit for processing the image of the person obtained by the image pickup unit based on image information of the human face detected by the control unit when the human face is detected by the control unit, and recording the processed image of the person.

According to another aspect of the present invention, there is provided a method of detecting a human face, using an information storing unit for previously storing information for defining peculiarities of a human face of a person, the method which comprises the steps of a judging step of judging which of a first mode and a second mode has been selected, wherein the first mode is a mode in which priority is put to a speed at which the human face is detected and the second mode is a mode in which priority is put to accuracy of detecting the human face, and when it is determined at the judging step that the first mode has been selected, a step of controlling to read less information from the information storing unit than information which is to be read from the information storing unit when it is determined that the second mode has been selected, and to detect the human face in an image of the person which has been obtained, using the read less information.

According to still another aspect of the present invention, there is provided a computer readable recording medium mounted on an image pickup apparatus having an image pickup unit for obtaining an image of a person and an information storing unit for previously storing information defining peculiarities of a human face of a person, the computer readable recording medium having encoded thereon a computer program when executed by a computer to implement a function which comprises a judging function of judging which of a first mode and a second mode has been selected, wherein the first mode is a mode in which priority is put to a speed at which the human face is detected and the second mode is a mode in which priority is put to accuracy of detecting the human face, and when it is determined that the first mode has been selected, a controlling function of controlling to read less information from the information storing unit than information which is to be read from the information storing unit when it is determined that the second mode has been selected, and to detect the human face in the image of the person whose image has been obtained by the image pickup unit, using the read less information.

DETAILED DESCRIPTION OF THE PREFERRED EMBODIMENTS

Figure 1:
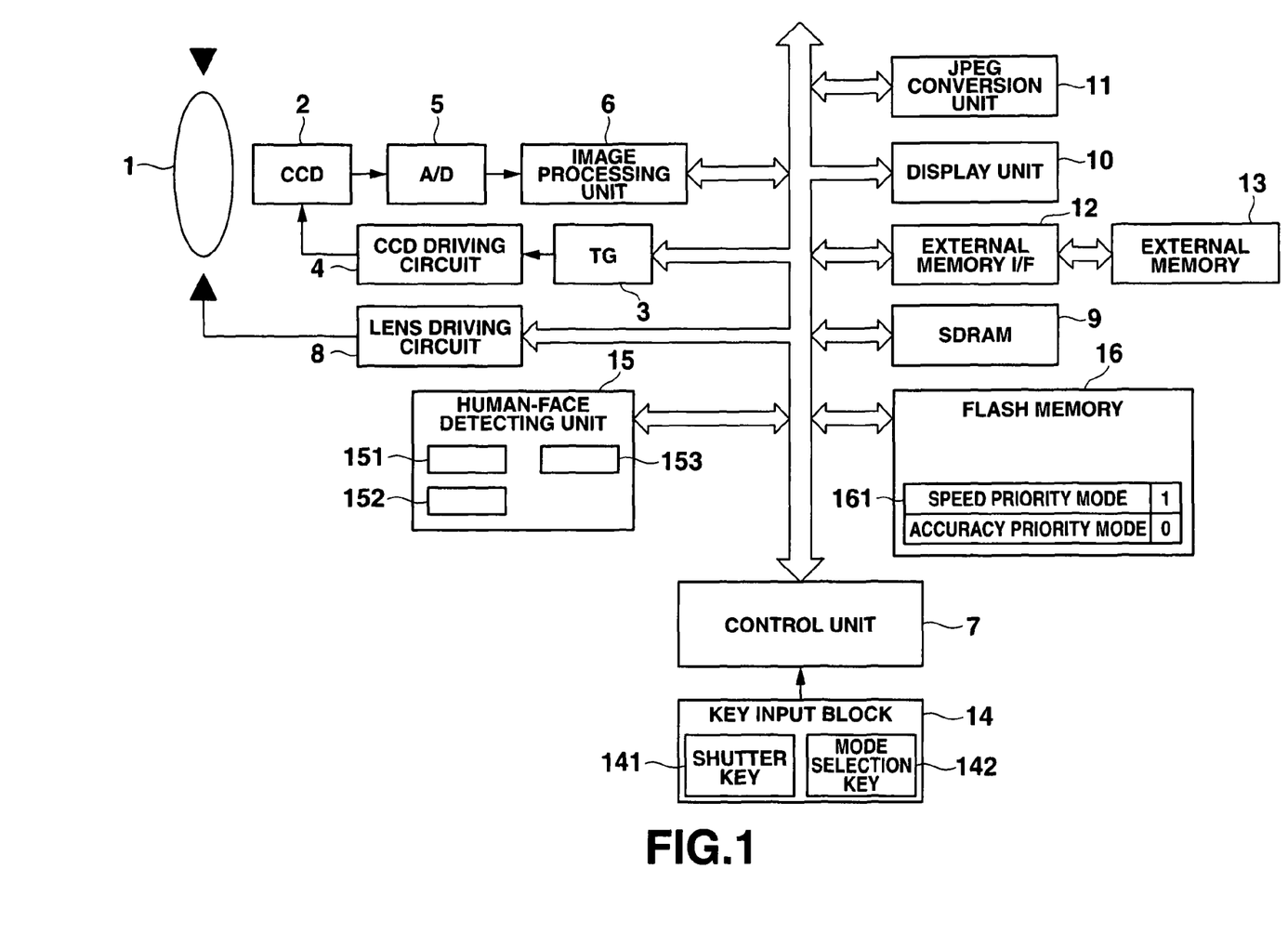
FIG. 1 is a block diagram of a digital camera according to the present invention.

FIG. 1 is a block diagram representing a schematic configuration of a digital camera according to an embodiment of the present invention.

The present digital camera has various functions such as an automatic exposure function (AE), automatic focusing function (AF) and human-face detection function, and mainly consists of the following units.

The present digital camera is provided with an optical system 1 and CCD 2, wherein the optical system 1 focuses an optical image of an object on CCD 2, and CCD 2 serves as an image pickup unit for executing a photoelectric conversion process on the optical image focuses on CCD 2, thereby outputting an image pickup signal (image signal).

A timing signal generator (TG) 3 generates a timing signal and a CCD driving circuit 4 drives CCD 2 using a driving signal generated based on the timing signal.

An A/D converter 5 converts the image signal output from CCD 2 (image pickup unit) into a digital signal and supplies the digital signal to an image processing unit 6.

The optical system 1 includes a focus lens and a lens motor for moving the focus lens along its optical axis. A lens driving circuit 8 generates a driving signal to drive the lens motor, whereby a position of the focus lens is adjusted on the optical axis.

The image processing circuit 6 executes a RGB interpolation process, a YUV conversion process and a digital signal process, wherein RGB interpolation process is for processing the image signal converted by A/D converter 5 to generate R, G, B color component data for each pixel (RGB data), and YUV conversion process is for processing RGB data to generate YUV data for each pixel including a luminance signal (Y) and color-difference signals (U, V), and further the digital signal process is used to apply a white balance adjustment on an image and to emphasize the contour of an image, thereby enhancing image quality of the image.

YUV data generated in YUV conversion process is successively stored on SDRAM 9.

The digital camera is further provided with a display unit 10, which includes a liquid crystal display monitor and its driving circuit.

When an image pickup mode is set in the digital camera, YUV data stored on SDRAM 9 is converted into a video signal by the image processing unit 6 every time when YUD data of one frame is stored on SDRAM 9 and the video signal is displayed on the display unit 10 (liquid crystal display monitor) as a through image.

When data is recorded in an external memory 13, YUV data temporarily stored on SDRAM 9 is compressed and encoded into a still image file in JPEG format by a JPEG conversion unit 11 and the still image file is recorded through an external memory I/F 12 in the external memory 13. Various memory cards are used as the external memory 13.

The still image file stored in the external memory 13 is read in response to selection operation of a user in a reproducing mode and is expanded as YUV data over SDRAM 9 by JPEG conversion unit 11 and then displayed as a still image on the display unit 10.

A key input block 14 has plural keys including a shutter key 141, mode selection key 142, power source key and MENU key, and a key operated state of the key input block 14 is scanned as needed by a control unit 7.

The mode selection key is operated to selectively set a speed priority mode or an accuracy priority mode, wherein the speed priority mode is a mode in which priority is put to a speed at which a human face is detected and the accuracy priority mode priority is a mode in which priority is put to accuracy of facial recognition.

The user is allowed to selectively press the shutter key 141 full-way or halfway.

The control unit 7 includes CPU and its peripheral circuits. The control unit 7 controls operation of various units of the digital camera, AE operation based on luminance information included in the image pickup signal, AF operation based on a contrast detection system, and a facial recognition to be described later.

Various sorts of computer programs for the control unit 7 to execute the above control operation, various sorts of data necessary for performing the controlling operation are memorized in a flash memory 16. The flash memory is a nonvolatile memory of a data rewritable type.

Further in the flash memory 16 are memorized setting information relating to various functions of the digital camera, including a mode setting table 161 for memorizing flag information representing results of detection of selection operation of the mode selection key 142 by the user.

A human-face detecting unit 15 executes a human-face detecting process to detect a facial area of the object image in image data of one frame generated by the image processing unit 6, using a facial peculiarity dictionary to be described later.

Figure 2:
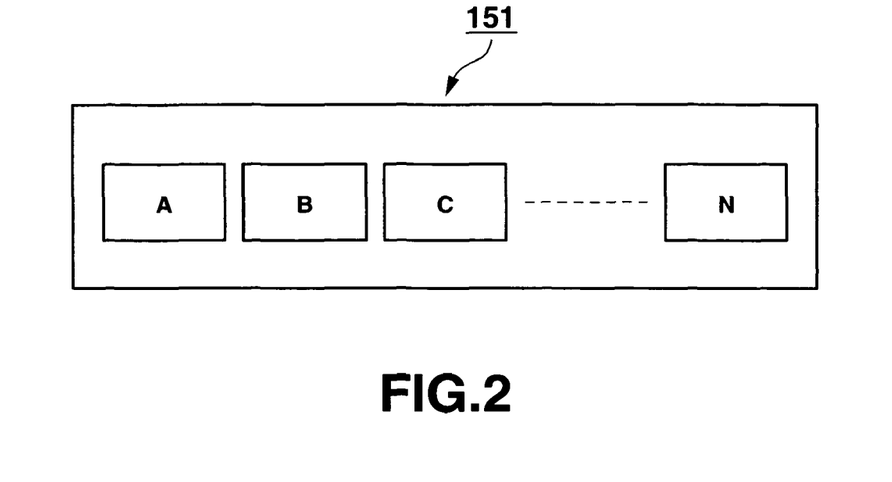
FIG. 2 is a schematic view showing a configuration of a human face dictionary set 151.
Figure 3:
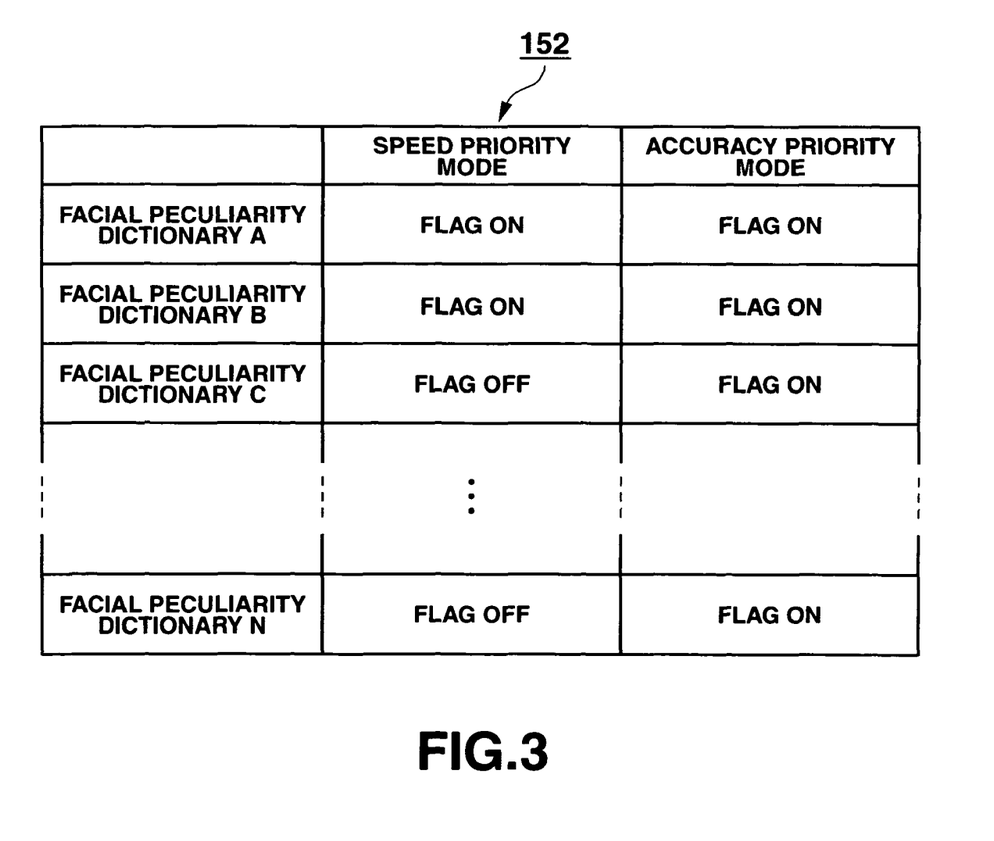
FIG. 3 is a schematic view showing a facial peculiarity dictionary setting table 152.
Figure 4A:
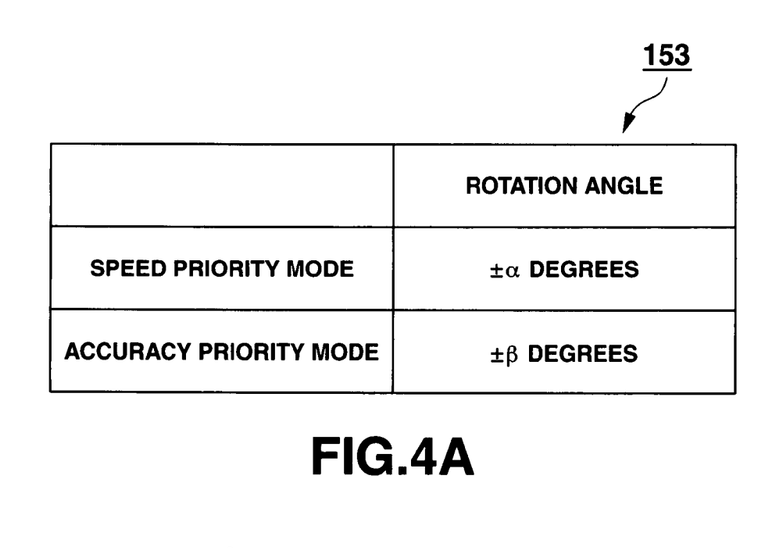
FIG. 4A is a schematic view showing a rotation angle setting table 153.

More specifically, the human-face detecting unit 15 includes a frame memory for temporarily memorizing the image data of one frame and an image processing circuit for executing various processes necessary for the human-face detecting operation, and further memorizes a human face dictionary set 151 shown in FIG. 2, a facial peculiarity dictionary setting table 152 shown in FIG. 3, and a rotation angle setting table 153 shown in FIG. 4A.

FIG. 2 is a view showing a configuration of the human face dictionary set 151. In the human face dictionary set 151 are memorized plural sets (N sets) of facial peculiarity dictionaries A, B, . . . , N.

Peculiarity values representing shapes and sizes of plural facial regions (eyes, nose, mouth) in human faces of objects, contours of human faces, and positions of the facial regions as viewed from the front are classified by age and race, and these peculiarity values are memorized in the facial peculiarity dictionaries A, B, . . . , N.

The human-face detecting unit 15 successively reads image areas of YUV data every predetermined dimension, wherein YUV data has been obtained by the image pickup operation, and extracts a contour of the read image area to calculate a peculiarity value. Further, the human-face detecting unit 15 compares the calculated peculiarity values respectively with peculiarity values registered in the facial peculiarity dictionaries A, B, . . . , N memorized in the human face dictionary set 151, thereby evaluating a degree of coincidence between the calculated peculiarity values and the registered peculiarity values to output an evaluation value to the control unit 7.

When supplied with the evaluation values from the human-face detecting unit 15, the control unit 7 evaluates the evaluation values and determines that the human face of the object is included in the image area of the highest evaluation value.

FIG. 3 is a view illustrating the contents of the facial peculiarity dictionary setting table 152.

Setting states of the flags are memorized in the facial peculiarity dictionary setting table 152, wherein the setting states of the flags represent the dictionaries to be read from among the facial peculiarity dictionaries A, B, . . . , N both in the speed priority mode and in the accuracy priority mode.

In FIG. 3, since the flags corresponding to the facial peculiarity dictionaries A, B, . . . , N in the accuracy priority mode are set to ON, the facial peculiarity dictionaries A, B, . . . , N are read when the accuracy priority mode is selected.

Meanwhile, the flags corresponding to the facial peculiarity dictionaries A and B in the speed priority mode are set to ON, and therefore, only the dictionaries A and B among the facial peculiarity dictionaries A, B, . . . , N are read when the speed priority mode is selected.

FIG. 4A is a view illustrating the rotation angle setting table 153.

In the rotation angle setting table 153, rotation angles of a human face of $\pm\alpha$ degrees are set for the speed priority mode, and rotation angles of a human face of $\pm\beta$ degrees are set for the accuracy priority mode, wherein in the speed priority mode a human face can be detected within the range of rotation angle of $\pm\alpha$ degrees, and in the accuracy priority mode a human face can be detected within the range of rotation angle of $\pm\beta$ degrees.

Figure 4B:
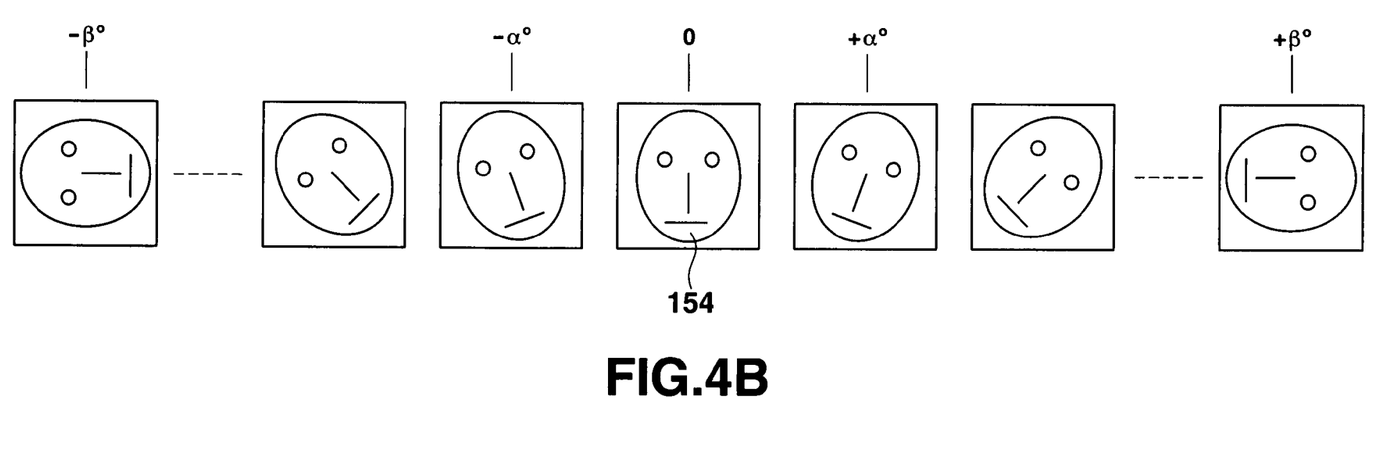
FIG. 4B is a view illustrating rotation angles in the rotation angle setting table 153 shown in FIG. 4A.

As shown in FIG. 4B, the rotation angles of a human face represent angles at which a human face image 154 rotates in the clock wise direction (positive direction) or in the counter clock wise direction (negative direction). The rotation angles α and β have the following relationship: α<β.

Now, operation of the digital camera having the above configuration will be described in detail.

Figure 5:
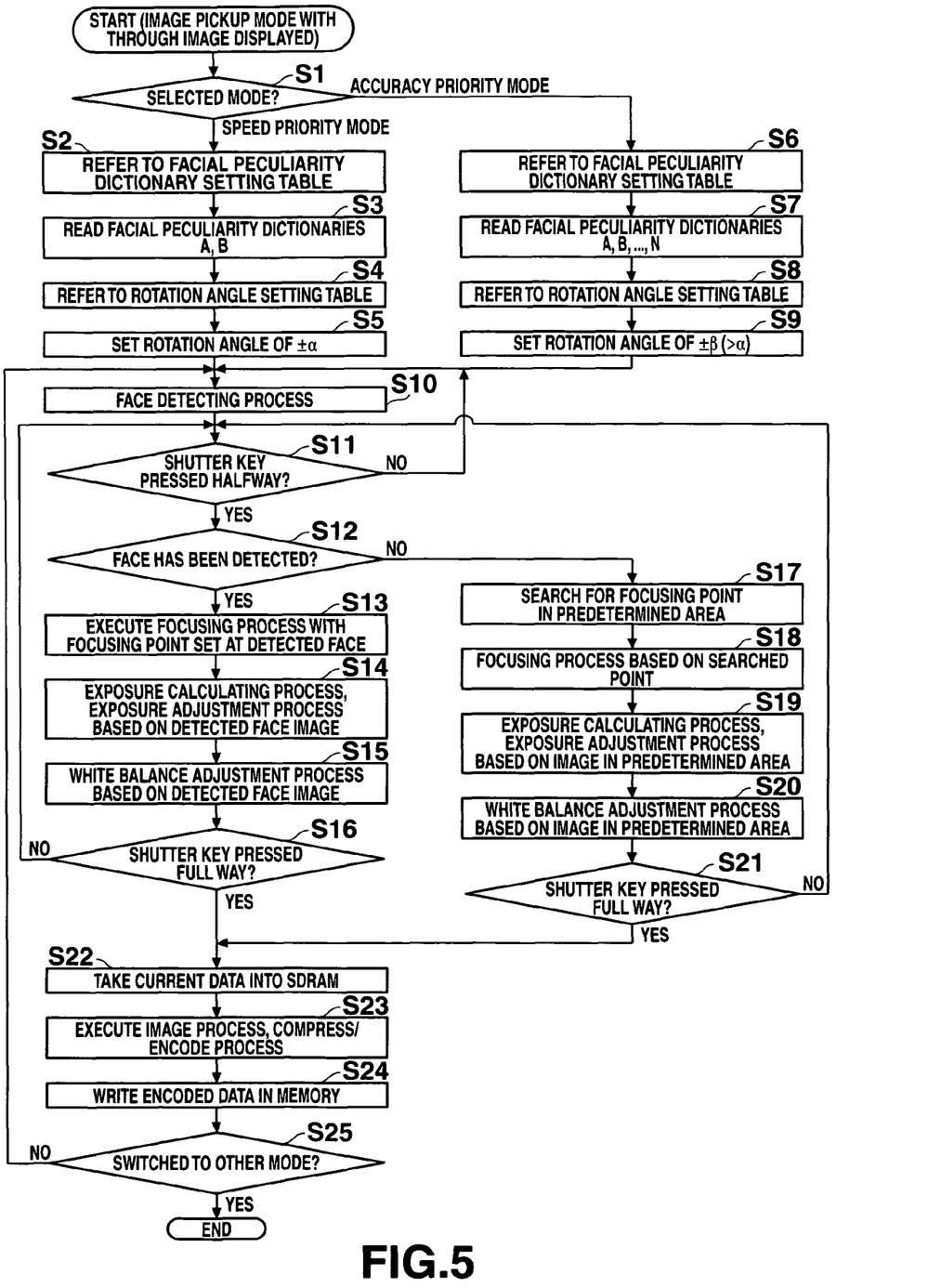
FIG. 5 is a flow chart showing processes to be executed in the digital camera according to the present embodiment.

When the power source switch is turned on and the image pickup mode is set, the control unit 7 displays a through image on the display unit 10, and further executes processes in accordance with a flow chart shown in FIG. 5, based on the control program stored in the flash memory 16.

The control unit 7 judges based on the flag information memorized in the mode setting table 161 at step S1, whether the speed priority mode has been selected by the user or whether the accuracy priority mode has been selected by the user.

When it is determined that the speed priority mode has been selected, the control unit 7 refers to the facial peculiarity dictionary setting table 152 at step S2.

As described above, only the flags corresponding to the facial peculiarity dictionaries A and B are set to ON and the flags corresponding to the facial peculiarity dictionaries C to N are set to OFF for the speed priority mode in the facial peculiarity dictionary setting table 152.

Therefore, only the facial peculiarity dictionaries A and B whose flags are set to ON for the speed priority mode in the facial peculiarity dictionary setting table 152 are read out from the human face dictionary set 151 and written on a work area of SDRAM 9 at step S3.

Then, the control unit 7 refers to the rotation angle setting table 153 at step S4.

Since the rotation angles of ±α degrees are memorized for the speed priority mode in the rotation angle setting table 153, the angles of ±α are set as rotation angles at step S5.

Thereafter, the control unit 7 makes the human-face detecting unit 15 execute a face detecting process at step S10.

The face detecting process is a process for judging whether any area including the peculiarity values memorized in the facial peculiarity dictionaries A or B is found in image data of one frame or through images, which are successively output from CCD 2, stored on SDRAM 9 and displayed on the display unit 10.

When it is determined that an area including the peculiarity values memorized in the dictionary of facial peculiarity A or B is found in the image data of one frame, the human-face detecting unit 15 determines that such area is an area including a face image.

On the contrary, when it is determined that the area including the peculiarity values memorized in the dictionary of facial peculiarity A or B is not found in the image data of one frame, the human-face detecting unit 15 rotates the peculiarity value memorized in the facial peculiarity dictionary A by "−α" degrees, thereby generating a peculiarity value A−α. Then, the human-face detecting unit 15 judges whether any area including the peculiarity value A−α is found in the image data of one frame.

When it is determined that the area including the peculiarity value A−α is not found in the image data of one frame, the human-face detecting unit 15 rotates the peculiarity value memorized in the dictionary of facial peculiarity A by "+α" degrees, thereby generating a facial peculiarity A+α. Then, the human-face detecting unit 15 judges whether any area including the facial peculiarity A +α is found in the image data of one frame.

When it is determined that the area including the peculiarity value A+α is not found in the image data of one frame, the human-face detecting unit 15 rotates the peculiarity value memorized in the facial peculiarity dictionary B by "−α" degrees, thereby generating a facial peculiarity B−α. Then, the human-face detecting unit 15 judges whether any area including the facial peculiarity B −α is found in the image data of one frame.

When it is determined that the area including the peculiarity value B−α is not found in the image data of one frame, the human-face detecting unit 15 rotates the peculiarity value memorized in the facial peculiarity dictionary B by "+α" degrees, thereby generating a facial peculiarity B+α. Then, the human-face detecting unit 15 judges whether any area including the facial peculiarity B+α is found in the image data of one frame.

As in the manner described above, the human-face detecting unit 15 executes a face detecting process to judge whether any area including the peculiarity value is found in the image data of one frame. Therefore, even if a person tilts his or her face, his or her face can be detected.

In the above face detecting process, the peculiarity value memorized in the facial peculiarity dictionary is rotated, and it is judged whether an area including the rotated peculiarity value is found in the image data of one frame, but modification may be made to the above face detecting process that the image data of one frame is rotated in place of the peculiarity value and it is judged whether any area including the peculiarity value is found in the rotated image data of one frame.

More specifically, when an area including the peculiarity value memorized in the facial peculiarity dictionary A or B is not found in the image data of one frame, the image data of one frame is rotated by "−α" degrees and it is judged whether any area including the peculiarity value memorized in the facial peculiarity dictionary A or B is found in the image data of one frame rotated by "−α" degrees.

When the area including the peculiarity value memorized in the facial peculiarity dictionary A or B is not found in the image data of one frame rotated by "−α" degrees, the image data of one frame is rotated by "+α" degrees and it is judged whether any area including the peculiarity value memorized in the facial peculiarity dictionary A or B is found in the image data of one frame rotated by "+α" degrees.

When the area including the above peculiarity value is found in the rotated image data of one frame, the human-face detecting unit 15 determines that the area is an area including a face of a person and displays a frame so as to include the face of the person therein.

Figure 6A:
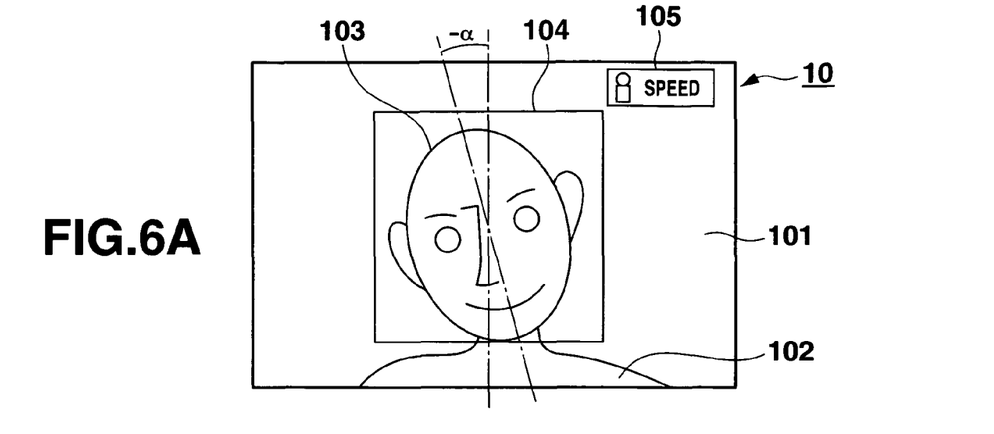
FIGS. 6A, 6B and 6C are views illustrating through images displayed on a display unit 10.

When a face of a person is detected, a face frame 104 is displayed so as to include a face 103 of a person 102 to be photographed in a through image 101 displayed on the display unit 10.

The control unit 7 judges at step S11 whether the shutter key 141 has been pressed halfway by the user. The control unit 7 makes the human-face detecting unit 15 repeatedly execute a face detecting process (step S10) until the control unit 7 confirms that the shutter key 141 has been pressed halfway.

Figure 6B:
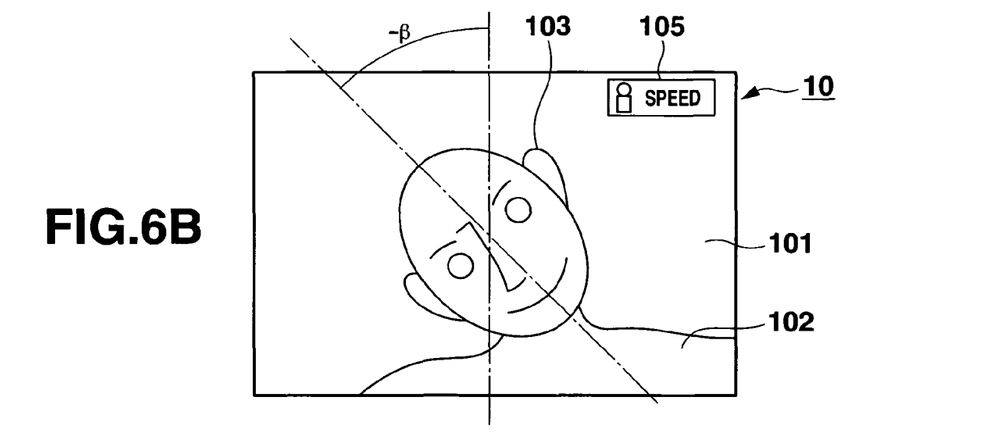
Figure 6C:
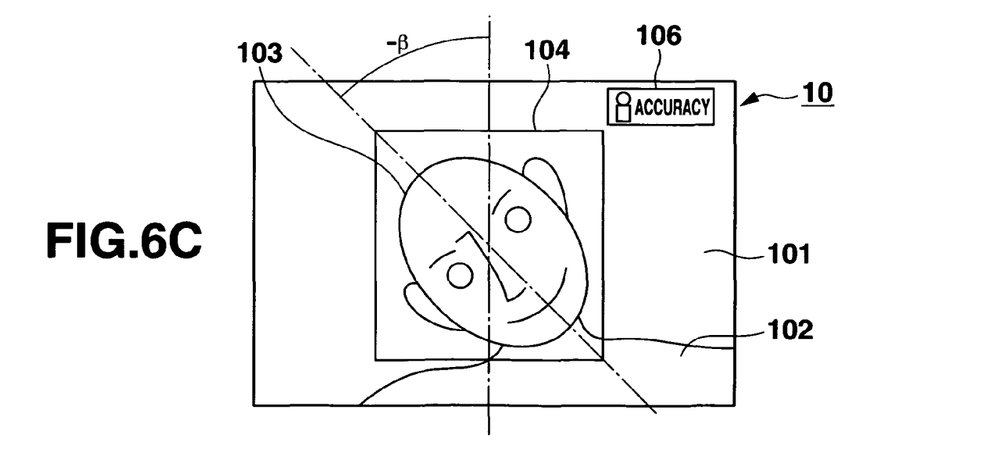

Since the face detecting process (step S10) is repeatedly executed, the face frame 104 follows the movement of the face of the person 102 to be photographed, even though the person moves in the through image 101, as shown in FIGS. 6A, 6B and 6C.

When it is determined at step S11 that the shutter key 141 has been pressed halfway (YES at step S11), then the control unit 7 advances to step S12 to judges whether or not the face of the person has been detected.

When the face of the person has been detected (YES at step S12), the control unit 7 executed a focusing process with a focusing point set at the detected face at step S13.

In other words, the image data within the face frame 104 is used for obtaining a contrast value, that is, an area falling within the face frame is used as an area (AF evaluation area) for obtaining the contrast value, and the lens driving circuit 8 is driven under AF control to focus on data within the face frame 104.

The control unit 7 executes an exposure calculation and adjustment process based on the detected face within the face frame 104, and executes AE control based on luminance information included in the image pickup signal within the face frame 104 at step S14.

The control unit 7 executes a white balance adjustment process with respect to the detected face within the face frame 104 to make parts appearing white in the detected face to be rendered white at step S15.

Further, the control unit 7 judges at step S16 whether the shutter key 141 has been pressed full-way by the user. When the shutter key 141 has not been pressed full-way (NO at step S16), the control unit 7 returns to step S11.

When the shutter key 141 has been pressed full-way (YES at step S16), the control unit 7 takes current image data of one frame into SDRAM 9 at step S22.

Executing an image processing and compressing/encoding process on the image pickup data temporarily memorized on SDRAM 9, JPEG conversion unit 11 compresses and encodes said image pickup data in JPEG format at step S23.

The image pickup data compressed and encoded as described above is written as a still image file on the external memory 13 through the external memory I/F 12 at step S24.

When the face of the person has been detected in the through image (YES at step S12), the focusing process is executed to focus on the facial image within the face frame 104, and further the exposure adjustment process and the white balance adjustment process are executed with respect to the facial image within the face frame 104 at steps S13 to S15.

Accordingly, when the face of the person has been detected in the through image, an image of the person 102 with his or her face 103 in focus, exposed properly and having the white balance set appropriately can be obtained and recorded as a still image file.

After executing the process at step S24, the control unit 7 judges at step S25 whether the currently set speed priority mode or accuracy priority mode has been switched to other mode.

When the currently set mode is kept or the currently set mode has been switched to other mode (NO at step S25), the control unit 7 returns to step S10. Meanwhile, when the currently set mode has been switched to other mode (YES at step S25), the control unit 7 finishes the process in accordance with the flow chart of FIG. 5.

When the face of the person has not been detected in the through image (NO at step S12), the control unit 7 searches for a focusing point within a previously determined focusing area of the image of one frame at step S17.

When the focusing point has been searched for at step S17, the control unit 7 executes the AF control process to drive the lens driving circuit 8, thereby focusing on the focusing point searched for in the focusing area at step S18.

The control unit 7 executes the exposure calculation and adjustment process based on the focused image (step S18) within the focusing area at step S19, and further executes the white balance adjustment process with respect to the focused image (step S18) within the focusing area at step S20.

Further, the control unit 7 judges at step S21 whether the shutter key 141 has been pressed full-way. When the shutter key 141 has not been pressed full-way (NO at step S21), the control unit returns to step S11, and when the shutter key 141 has been pressed full-way (YES at step S21), the control unit advances to step S22.

As described above, when the face of the person has not been detected in the through image, the control unit 7 executes the focusing process with the searched focusing point at steps S17 to S20, and executes the exposure adjustment process and the white balance adjustment process with respect to the image within the focusing area.

Accordingly, even though the face of the person has not been detected in the through image, the image of the person with the predetermined focusing point in focus, properly exposed and having the white balance set appropriately can be obtained and recorded as a still image file.

Meanwhile, when it is determined at step S1 that the accuracy priority mode has been selected, the control unit 7 advances to step S6, where the facial peculiarity dictionary setting table 152 is referred to.

In the facial peculiarity dictionary setting table 152, the flags corresponding to all the facial peculiarity dictionaries A, B, N are set to ON for the accuracy priority mode.

Then, all the facial peculiarity dictionaries A, B, N whose flags are set to ON in the facial peculiarity dictionary setting table 152 are read from the human face dictionary set 151 and written on the work area of SDRAM 9 at step S7.

Further, the rotation angle setting table 153 is referred to at step S8. Since the rotation angles of ±β degrees are memorized for the accuracy priority mode in the rotation angle setting table 153, the angles of ±β are set as rotation angles at step S9.

Thereafter, the control unit 7 makes the human-face detecting unit 15 execute the face detecting process at step S10.

In a different manner from the face detecting process for the speed priority mode, it is successively judged whether any area including the peculiarity values memorized in all the facial peculiarity dictionaries A, B, . . . , N is found in image data of one frame or through images, which are successively output from CCD 2, stored on SDRAM 9 and displayed on the display unit 10 in the face detecting process for the accuracy priority mode.

When it is determined that an area including the peculiarity values memorized in the facial peculiarity dictionaries A, B, . . . , N is found in the image data of one frame, the human-face detecting unit 15 determines that such area is an area including a face image.

In the face detecting process executed in the speed priority mode, it is judged whether any area including the peculiarity values memorized in the dictionary of facial peculiarity A or B is found in the image data of one frame. But on the contrary, in the face detecting process in the accuracy priority mode, it is successively judged whether any area including the peculiarity values memorized in the facial peculiarity dictionaries A, B, . . . , N is found in the image data of one frame.

In the accuracy priority mode, the facial peculiarity dictionaries A, B, . . . , N are referred in the face detecting process, and in the speed priority mode the dictionary of facial peculiarity A or B is referred in the face detecting process. Therefore, since the face detecting process requires a longer time in the accuracy priority mode than in the speed priority mode, the user frequently loses photo opportunities when the digital camera is set to the accuracy priority mode.

If the user does not want to lose photo opportunities, the digital camera should be set to the speed priority mode, which requires a short processing time, allowing the user to shoot pictures without frequently losing photo opportunities.

Meanwhile, in the case where the accuracy priority mode is set to the digital camera, a human face can be detected in more precise than in the speed priority mode, since all the facial peculiarity dictionaries A, B, . . . , N are referred to in the accuracy priority mode.

Therefore, when the user wants to detect a human face in more precise to take a pictures of a person, the accuracy priority mode should be set to the digital camera to detect a human face 103 of the person 102 in more precise, whereby the user can take a picture of the person 102 with his or her face 103 in focus, properly exposed and having the white balance set appropriately.

Using the digital camera described above, the user can take pictures of a person with his or her face in focus without losing photo opportunities.

When it is determined that an area including the peculiarity values memorized in the facial peculiarity dictionaries A, B, . . . , N is not found in the image data of one frame, the peculiarity values memorized in the dictionary of facial peculiarity A are successively rotated by an angle in a range from "$-\alpha$" to "$-\beta$" degrees to generate peculiarity values A$-\alpha$, . . . , A$-\beta$, and it is judged whether an area including the peculiarity value A$-\alpha$, . . . , or A$-\beta$ is found in the image data of one frame.

When it is determined that an area including the peculiarity value A$-\alpha$, . . . , or A$-\beta$ is not found in the image data of one frame, the peculiarity values memorized in the facial peculiarity dictionary A are successively rotated by an angle in a range from "$+\alpha$" to "$+\beta$" degrees to generate peculiarity values A$+\alpha$, . . . , A$+\beta$ and it is judged whether an area including the peculiarity value A$+\alpha$, . . . , or A$+\beta$ is found in the image data of one frame.

When it is determined that an area including the peculiarity value A$+\alpha$, . . . , or A$+\beta$ is not found in the image data of one frame, regarding the remaining peculiarity values memorized in the facial peculiarity dictionaries B, . . . , N, the same processes are executed, in other words, it is judged whether an area including the peculiarity value successively rotated by an angle in a range from "$-\alpha$" to "$-\beta$" degrees is found in the image data of one frame and further it is judged whether an area including the peculiarity values successively rotated by an angle in a range from "$+\alpha$" to "$+\beta$" degrees is found in the image data of one frame.

Therefore, in the case where the accuracy priority mode is set, the face detecting process is more frequently executed for detecting a tilted face than in the speed priority mode, and the face detecting process requires a longer time in the accuracy priority mode than in the speed priority mode where faces rotated by "$\pm\alpha$" degrees are referred to. As a result, there will be a much possibility of losing photo opportunities in the accuracy priority mode.

If the user does not want to lose photo opportunities while taking pictures, the speed priority mode in which the process requires a short time allows the user to take pictures without losing photo opportunities.

In the case where the accuracy priority mode is set, since a human face is rotated by an angle in the rotation angles of "$\pm\beta$" degrees, a human face is detected in an extremely high accuracy.

If the user wants to take a picture of a person with the priority set to a precise human face detection, the accuracy priority mode allows the user to take a picture of the person 102 with the face 103 detected in high accuracy under proper exposure conditions, whereby a picture of the person 102 with his or her face 103 in focus, having the white balance set appropriately is obtained.

FIGS. 6A, 6B and 6C are views illustrating through images in the speed priority mode and the accuracy priority mode. FIGS. 6A and 6B are views illustrating through images displayed on the display unit 10 in the speed priority mode, and FIG. 6C is a view illustrating a though image displayed on the display unit 10 in the accuracy priority mode.

In FIG. 6A, the through image 101 is displayed with an icon 105 displayed in an overlapping manner, wherein the icon 105 indicates that the speed priority mode is set as a mode for detecting a human face.

As shown in FIG. 6A, the face of the person 102 to be photographed is tilted by "$-\alpha$" degrees in the through image 101, but since the rotation angles are "$\pm\alpha$" degrees in the speed priority mode, the face detecting unit 15 detects the face as the human face 103 and displays the face frame 104 so as to include the human face 103 therein in the through image.

In FIG. 6B, the face of the person to be photographed 102 is tilted by "$\pm\alpha$" degrees in the through image 101, but since the rotation angles are "$\alpha$" degrees in the speed priority mode, wherein the angle "$\alpha$" degrees are smaller than "$\beta$" degrees, the face is not detected as the human face 103 and therefore the face frame 104 is not displayed in the through image.

Therefore, when the control unit 7 detects the shutter key 141 pressed halfway while the through image is displayed with no face frame 104 displayed, the processes at steps S17 to S20 in FIG. 5 are executed.

Meanwhile, since the rotation angles are "$\pm\beta$" degrees in the through image in the accuracy priority mode, the face detecting unit 15 detects the face as the human face 103 in the through image, and displays the face frame 104 so as to include the human face 103 therein in the through image as shown in FIG. 6C.

Further, an icon 106 is displayed in the through image 101 in an overlapping manner as sown in FIG. 6C, wherein the icon 101 indicates that the accuracy priority mode is set as the mode for detecting the human face.

As described above, since the user can learn from the through image displayed on the display unit 10, whether the speed priority mode has been selected as the mode for detecting the human face or whether the accuracy priority mode has been selected as the mode for detecting the human face, the user can confirm whether there are troubles and/or function deterioration in the digital camera without failure, even though the face of the person is not detected normally.

In the present embodiment, not only the number of the facial peculiarity dictionaries to be referred to but also the rotation angles are determined depending on whether the speed priority mode has been selected or whether the accuracy priority mode has been selected, but a modification may be made to the embodiment such that only the number of the facial peculiarity dictionaries to be referred to are changed to detect the human face regardless of the rotation angle of the human face.

In the detailed description of the present invention, the image pickup apparatus is applied to the digital camera but may be applied to any apparatus which includes an image pickup unit or operated in accordance with a computer program for performing the image pickup process.

What is claimed is:
1. An imaging apparatus comprising:
an imaging section;
an information storage section which stores information to define features of a face image;
a setting section which sets a detection precision of a face region;
a display section which displays an indicator indicating the detection precision set by the setting section together with a subject successively imaged by the imaging section;

a control section which limits information read from the information storage section in accordance with the detection precision set by the setting section to control detection of the face region from the successively imaged subject;

a display control section which, when the face region is detected through the control by the control section, controls the display section so as to display a face frame indicator in the detected face region of the subject in addition to the successively imaged subject and the indicator indicating the detection precision; and a recording section which processes and records a taken image based on image information of the face region where the face frame indicator is displayed by the display control section;

wherein the detection precision of the face region set by the setting section includes a first mode in which priority is given to face region detection speed and a second mode in which priority is given to face region detection precision;

wherein the setting section includes a selection detection section which selects one of the first and second modes;

wherein the information storage section stores a permissible rotation range of the face image as information with respect to a plurality of angles; and wherein, when the mode selected by the selection detection section is the first mode, the control section performs control to reduce a permissible rotation range read from the information storage section as compared with a case in which the second mode is selected and detected, so as to detect the face region from the subject imaged by the imaging section.

2. An imaging apparatus according to claim 1, wherein the information storage section stores a plurality of items of information according to features; and wherein, when the mode selected by the selection detection section is the first mode, the control section performs control to reduce a number of items of the information read from the information storage section as compared with a case in which the second mode is selected and detected, so as to detect the face region from the subject imaged by the imaging section.

3. An imaging apparatus according to claim 2, wherein, when the face region is detected through the control by the control section, the recording section performs an in-focus processing based on the image information of the face region to record the image.

4. An imaging apparatus according to claim 2, wherein, when the face region is detected through the control by the control section, the recording section performs an exposure measurement processing based on the image information of the face region to record the image.

5. An imaging apparatus according to claim 1, wherein, when the face region is detected through the control by the control section, the recording section performs an in-focus processing based on the image information of the face region to record the image.

6. An imaging apparatus according to claim 1, wherein, when the face region is detected through the control by the control section, the recording section performs an exposure measurement processing based on the image information of the face region to record the image.

7. A non-transitory computer readable medium having a face region detection program stored thereon which causes a computer equipped with an imaging portion to function as sections comprising:

a setting section which sets a detection precision of a face region;

a first display output section which displays an indicator indicating the detection precision set by the setting section together with a subject successively imaged by the imaging portion;

a control section which performs control to limit information read from an information storage portion, which stores information to define features of a face image, according to the detection precision set by the setting section, so as to detect a face region from the successively imaged subject; and a second display output section which, when the face region is detected through the control by the control section, performs control so as to display and output a face frame indicator in the detected face region of the subject in addition to what is output by the first display output section;

wherein the detection precision of the face region set by the setting section includes a first mode in which priority is given to face region detection speed and a second mode in which priority is given to face region detection precision;

wherein the setting section includes a selection detection section which selects one of the first and second modes;

wherein the information storage portion stores a permissible rotation range of the face image as information with respect to a plurality of angles; and wherein, when the mode selected by the selection detection section is the first mode, the control section performs control to reduce a permissible rotation range read from the information storage portion as compared with a case in which the second mode is selected and detected, so as to detect the face region from the subject imaged by the imaging section.

8. A face region detection method comprising:

setting a detection precision of a face region;

displaying and outputting an indicator indicating the set detection precision together with a subject successively imaged by an imaging portion;

performing control to limit information read from an information storage portion, which stores information to define features of a face image, according to the set detection precision, so as to detect a face region from the successively imaged subject; and when the face region is detected through the control, performing control so as to display and output a face frame indicator in the detected face region of the subject in addition to what is output in said displaying and outputting;

wherein the detection precision of the face region includes a first mode in which priority is given to face region detection speed and a second mode in which priority is given to face region detection precision;

wherein said setting the detection precision comprises selecting one of the first and second modes;

wherein the information storage portion stores a permissible rotation range of the face image as information with respect to a plurality of angles; and wherein, when the selected mode is the first mode, said control is performed to reduce a permissible rotation range read from the information storage portion as compared with a case in which the second mode is selected, so as to detect the face region from the subject imaged by the imaging section.

* * * * *